UNITED STATES PATENT OFFICE 2,657,168

POLYCHLORO BICYCLO HEPTANES AS INSECTICIDES

George Allen Buntin, Wilmington, Del., assignor to Hercules Powder Company, Wilmington, Del., a corporation of Delaware No Drawing. Application October 17, 1950,
Serial No. 190,663

5 Claims. (Cl. 167—30)

This invention relates to new polychloro bicycloheptanes and more particularly to chlorinated condensates of cyclopentadiene and a vinyl compound and to insecticidal compositions containing these polychloro bicycloheptanes as the toxic ingredient.

In accordance with this invention, it has been found that the condensates of cyclopentadiene with hydrocarbons or chlorohydrocarbons containing a vinyl radical may be chlorinated to prepare new polychloro bicyclo[2.2.1]heptanes containing at least four chlorine atoms and preferably containing from about 55% to about 75% chlorine, and that insecticidal compositions containing these chlorinated condensates of cyclopentadiene and vinyl hydrocarbons or vinyl chlorohydrocarbons possess an unusual degree of insecticidal activity.

The following examples will illustrate the preparation of these new polychloro bicycloheptanes and the insecticidal activity of compositions containing them. All parts and percentages are by weight unless otherwise specified.

EXAMPLE I 2-methyl-bicyclo[2.2.1]-5-heptene was prepared by condensing cyclopentadiene with propylene in the following manner, the source of the cyclopentadiene being dicyclopentadiene which dedimerized at the temperature of the reaction. A mixture of 438 parts of dicyclopentadiene and 482 parts of propylene was placed in a pressure vessel and heated at 228° C. for 2.5 hours, the pressure rising to a maximum of 1800 p. s. i. and dropping to a final pressure of 200 p. s. i. at 85° C. The reaction mixture after releasing the pressure amounted to 599 parts. It was fractionally distilled at atmospheric pressure and the fraction boiling at 115.5° to 116.0° C. at 750 mm. pressure amounted to 269 parts.

Two hundred eighty-seven parts of the above 2-methyl-bicyclo[2.2.1]-5-heptene was dissolved in 1435 parts of carbon tetrachloride. Chlorine was passed into the agitated mixture in the presence of ultraviolet light, the temperature rising, due to the heat of the reaction, to a maximum of about 67° C. and gradually decreasing as the chlorination proceeded. Samples were taken at the end of 11, 17, 21, 26, and 32 hours of chlorination. The carbon tetrachloride was removed from each of these samples by distillation under reduced pressure. The residue remaining was then dissolved in petroleum ether, washed with water, then with a 5% sodium bicarbonate solution and finally was dried over anhydrous sodium sulfate. The petroleum ether was distilled off under reduced pressure using a nitrogen sparge. A viscous yellow liquid remained in each case. The five polychloro-2-methyl-bicyclo[2.2.1]-heptanes were tested for their insecticidal activity against flies. In this and the following examples, the test for insecticidal activity was made in the following manner and is referred to in the specification as the bell jar method.

Approximately 100 five-day-old flies (*Musca domestica*) were placed in a bell jar and a predetermined quantity of the insecticide to be tested was atomized into the bell jar. The quantity of insecticide used was equal to the amount of the Official Test Insecticide which was necessary to give a 30–55% kill and must be within the limits of 0.4 to 0.6 ml. After spraying the insecticide into the chamber the flies were placed in an observation cage containing a wad of cotton wet with a dilute sugar solution. At the end of 24 hours, the number of dead and moribund flies was counted. All tests were carried out at 80°–90° F. and 50–70% relative humidity.

The results of the analysis for chlorine content and of tests made on solutions in deodorized kerosene of the above five polychloro 2-methyl-bicyclo[2.2.1]heptanes are given in the following table. The data are an average of a series of tests made on each solution.

*Bell jar test on flies*

| Chlorination Time in Hours | Percent Chlorine | 5% Solution in Deodorized Kerosene | | 0.5% Solution in Deodorized Kerosene | |
|---|---|---|---|---|---|
| | | Percent Dead in 24 Hours | O. T. I. Difference | Percent Dead in 24 Hours | O. T. I. Difference |
| 11 | 56.3 | 99 | +43 | | |
| 17 | 67.4 | | | 68 | +12 |
| 21 | 71.2 | | | 87 | +31 |
| 26 | 72.9 | | | 72 | +16 |
| 32 | 74.8 | 98 | +42 | 56 | 0 |

EXAMPLE II 2-phenyl-bicyclo[2.2.1]-5-heptene was prepared by condensing styrene with cyclopentadiene (obtained by the dedimerization of dicyclopentadiene) in the following manner.

To a mixture of 416 parts of styrene and 556 parts of dicyclopentadiene was added 20 parts of phenyl-β-naphthylamine as a polymerization inhibitor. The solution was refluxed for 7 hours, an immediate exothermic reaction occurring when the material reached a temperature of 130° C. The reaction product was fractionally distilled under reduced pressure and the fraction boiling at 85° to 88° C. at 1.4 mm. pressure was collected. This fraction amounted to 160 parts and the product was found to have an R. I. at 20° C. of 1.5470 and a molecular weight of 167 (calculated 170).

One hundred parts of the above 2-phenyl-bicyclo[2.2.1]-5-heptene was dissolved in 1500 parts of carbon tetrachloride. Chlorine was passed into the agitated solution in the presence of ultraviolet light and samples were taken at the end of 3 and 7 hours of chlorination. The carbon tetrachloride was removed from each of these samples by distillation under reduced pressure using a nitrogen sparge at 100° C. The products were very viscous yellow liquids. The results of the analysis for chlorine content and the tests made on 5% solutions in deodorized kerosene of the above polychloro-2-phenyl-bicyclo[2.2.1]heptanes are given in the following table:

*Bell jar test on flies*

| Chlorination Time in Hours | Percent Chlorine | Percent Dead in 24 Hours | O. T. I. Difference |
|---|---|---|---|
| 3 | 55.9 | 98 | +48 |
| 7 | 63.4 | 99 | +47 |

EXAMPLE III

2 - (cyclohexenyl - 3) - bicyclo[2.2.1] - 5 - heptene was prepared by condensing cyclopentadiene (obtained by the dedimerization of dicyclopentadiene) and 1-vinyl-cyclohexene-3 in the following manner:

A mixture of 54 parts of dicyclopentadiene, 91 parts of 1-vinyl-cyclohexene-3, and 1.5 parts of tert-butylcatechol was charged into a stainless steel bomb and was heated to 225° to 228° C. for 9½ hours. After cooling, the reaction mixture was removed from the bomb and fractionated. Thirty-three parts of a water-white liquid was collected at 123° to 128° C. at 10–11 mm. pressure. The product had an R. I. at 20° C. of 1.5243, a molecular weight of 177 (calculated 174), and a bromine number of 177 (calculated 184).

The above 2-(cyclohexenyl-3)-bicyclo[2.2.1]-5-heptene was dissolved in 700 parts of carbon tetrachloride. Chlorine was passed into the agitated solution in the presence of ultraviolet light and samples were taken at the end of ¼ hour and 1 hour of chlorination. The carbon tetrachloride was removed from each of these samples by distillation under reduced pressure using a nitrogen sparge at 100° C. The products were viscous yellow liquids. The results of the analysis for chlorine content and of insecticidal tests made on 5% solutions of these polychloro-2-(cyclohexyl)-bicyclo[2.2.1]heptanes in deodorized kerosene are given in the following table:

*Bell jar test on flies*

| Chlorination Time in Hours | Percent Chlorine | Percent Dead in 24 Hours | O. T. I. Difference |
|---|---|---|---|
| .25 | 59.9 | 70 | +19 |
| 1.00 | 64.9 | 88 | +37 |

The polychloro compounds of this invention are obtained by chlorinating a condensate of cyclopentadiene with a hydrocarbon or chlorohydrocarbon containing a vinyl radical. The condensate which is chlorinated is obtained by condensing cyclopentadiene with any hydrocarbon or chlorohydrocarbon having 2 to 14 carbon atoms and containing a vinyl radical as, for example, acyclic, aromatic, or alicyclic hydrocarbons or chlorohydrocarbons containing a vinyl radical. Typical of the unsaturated hydrocarbons and chlorohydrocarbons which may be condensed with cyclopentadiene to produce these condensates are olefinic compounds such as ethylene, propylene, butylene, etc., vinyl chloride, allyl chloride, etc., diolefinic compounds such as butadiene, isoprene, chloroprene, dimethylbutadiene, etc., vinyl aromatic hydrocarbons such as styrene, divinylbenzene, vinyl naphthalene, etc., and vinyl alicyclic compounds such as the vinyl cyclohexenes, etc. When cyclopentadiene is condensed with a diolefin such as butadiene, the product is usually a mixture since the diolefin tends to dimerize forming, in the case of butadiene, 1-vinyl-cyclohexene-3. The latter then condenses with the cyclopentadiene to form 2 - (cyclohexenyl - 3) - bicyclo[2.2.1] - 5 - heptene which is the chief product of the condensation rather than 2-vinyl-bicyclo[2.2.1]-5-heptene which would be expected if no dimerization of the butadiene took place.

The condensate of cyclopentadiene with a vinyl compound is a bicyclo[2.2.1]-5-heptene having the following structural formula

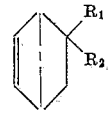

where $R_1$ may be hydrogen, halogen, alkyl, chloroalkyl, alkenyl, chloroalkenyl, cycloalkyl, chlorocycloalkyl, cycloalkenyl, chlorocycloalkenyl, aryl and chloroaryl, and $R_2$ may be hydrogen, halogen, alkyl or chloroalkyl.

The condensation of cyclopentadiene with the vinyl hydrocarbon or chlorohydrocarbon is readily carried out by heating the two reactants together, usually at a temperature of about 100° C. to about 250° C. In the case of the lower molecular weight vinyl hydrocarbons, the reaction is preferably carried out under pressure. A polymerization inhibitor may be added to the reaction mixture in order to avoid the polymerization of the vinyl hydrocarbon if polymerization tends to predominate. A convenient source of cyclopentadiene is dicyclopentadiene which dedimerizes at the temperature of the condensation reaction.

The chlorination is carried out in the presence or absence of catalysts but the reaction rate is impractically slow, especially toward the end of the chlorination, in the absence of catalysts and catalysts are, therefore, generally used for practical operation. Light is one of the most satisfactory catalysts and this is preferably actinic light. It acts by accelerating the formation of free radicals. Other catalysts may also be used by adding them to the chlorination mixture either at the beginning, during the course of, or toward the end of the chlorination process. As catalysts, one may use other free radical formers such as lead alkyls and organic peroxides including peroxy acids and peroxy anhydrides. Examples of the latter are well known in the chlorination art and include benzoyl peroxide and acetyl peroxide. Only a catalytic amount of catalyst, sufficient to accelerate the reaction, is needed and, if used up in the process, more will be added as required. More than a catalytic amount will not ordinarily be added at one time since better control is obtained by using only as much as is necessary for attaining the desired rate of chlorination. The preferred catalysts are the organic peroxides. The amount of catalyst used in the chlorination will ordinarily be within the range of about 0.001 to 5% based upon the chlorination mixture.

The chlorination is generally carried out in the liquid state. For instance, a volatile chlorinated solvent such as methylene chloride, chloroform, carbon tetrachloride, ethylene chloride, trichloroethane, tetrachloroethane, or pentachloroethane is generally used in order to maintain the liquid state and to reduce the viscosity sufficiently for good contact. Any well-known means of contacting the chlorine with the condensate may be used. A satisfactory method involves dispersing chlorine gas in the liquid and relying on the flow of the gas for agitation. Auxiliary agitation may also be supplied. Since the reaction is ordinarily carried out at atmospheric pressure, the solvent is chosen according to its boiling point so that the refluxing solvent can provide a satisfactory means of temperature control. When a solvent is used, the amount ordinarily is kept below about 20 volumes per volume of condensate being chlorinated and is generally within the range of 1-5 volumes per volume of condensate. The chlorine is generally added to the reaction mixture at substantially the rate at which it is consumed in the reaction.

The chlorination temperature is any temperature that chlorination will take place without decomposition of the product. Chlorination takes place slowly at 0° C., at a satisfactory rate in the range 50°–150° C., and with some decomposition and darkening at about 240° C. and higher. The most satisfactory range is 50–100° C.

The chlorination reaction is continued until the chlorinated product contains an amount of chlorine equivalent to at least four chlorine atoms per molecule and preferably from about 55% to about 75% chlorine. In the case of the polychloro condensates of cyclopentadiene and olefins, this percentage range corresponds to about 4 to 10 chlorine atoms per molecule, and with those of cyclopentadiene with alicyclic or aromatic vinyl compounds to about 4 to 14 chlorine atoms per molecule. The chlorinated product may be a single compound containing from about 55% to about 75% chlorine or it may be a mixture of such compounds. The period of time necessary for the chlorination will vary from about 15 minutes in the case of highly unsaturated condensates to 24 hours or more in the case of the more saturated condensates.

The polychloro condensates are recovered from the reaction mixture by removing the solvent by any convenient means such as distillation under reduced pressure or by dissolving the reaction mixture in an inert volatile solvent, washing the solution with alkali and water and then sparging the solution with an inert gas at an elevated temperature and under reduced pressure.

The new polychloro bicyclo[2.2.1]heptanes, obtained according to this invention and containing from 4 to 14 chlorine atoms and preferably from about 55% to about 75% chlorine, have a high degree of insecticidal activity and may be used as the toxic ingredient in insecticidal compositions. Polychloro bicyclo[2.2.1]heptanes having less than four chlorine atoms or a chlorine content less than about 55% are so inactive as to be worthless as insecticides. The polychloro condensates of cyclopentadiene and a vinyl compound may be a single compound or a mixture of polychloro condensates which have an average chlorine content of from about 55% to about 75%.

The insecticidal compositions of this invention are produced by admixing the polychloro bicyclo[2.2.1]heptanes having a chlorine content within the range of about 55% to about 75% with a suitable adjuvant which is an inert material to facilitate the mechanical distribution of the polychloro bicyclo[2.2.1]heptane toxicant. Inert materials to facilitate the mechanical distribution of the toxicant are added for the purposes outlined in Frear (Chemistry of Insecticides, Fungicides, and Herbicides by Donald E. H. Frear, second edition, 1948, page 5) to form sprays, dusts, and aerosols from the polychloro bicyclo[2.2.1]heptane. Surface-active dispersing agents are used in admixture with the polychloro bicyclo[2.2.1]heptane to promote the spreading of the toxic material so as to improve its effectiveness. They are used in both aqueous sprays and dusts. Hydrocarbon solvents such as deodorized kerosene are also used in sprays as the sole inert material to facilitate the mechanical distribution of the toxicant.

Suitable surface-active dispersing agents for use in the compositions of this invention are those disclosed in Chemistry of Insecticides, Fungicides, and Herbicides (l. c., pages 280–287) for use with known insecticides and include soaps of resin, alginic, and fatty acids and alkali metals or alkali amines or ammonia, saponins, gelatins, milk, soluble casein, flour and soluble proteins thereof, sulfite lye, lignin pitch, sulfite liquor, long-chain fatty alcohols having 12–18 carbon atoms and alkali metal salts of the sulfates thereof, salts of sulfated fatty acids, salts of sulfonic acids, esters of long-chain fatty acids and polyhydric alcohols in which alcohol groups are free, clays such as fuller's earth, china clay, kaolin, and bentonite and related hydrated aluminum silicates having the property of forming a colloidal gel. Among the other surface-active dispersing agents which are useful in the compositions of this invention are the omega-substituted polyethylene glycols of relatively long-chain length, particularly those in which the omega substituent is aryl, alkyl, or acyl. Compositions of the polychloro bicyclo[2.2.1]heptane toxic material and surface-active dispersing agent will in some instances have more than one surface-active dispersing agent for a particular type of utility, or in addition to a surface-active dispersing agent, hydrocarbons such as kerosene and mineral oil will also be added as improvers. Thus, the toxic material may contain a clay as the sole adjuvant or clay and hydrocarbon, or clay and another surface-active dispersing agent to augment the dispersing action of the clay. Likewise, the toxic material may have water admixed therewith along with the surface-active dispersing agent, sufficient generally being used to form an emulsion. All of these compositions of toxic material and surface-active dispersing agent may contain in addition synergists and/or adhesive or sticking agents. Thus the polychloro bicyclo[2.2.1]heptane mixtures admixed with these inert materials which facilitate the mechanical distribution of the polychloro bicyclo[2.2.1]heptane in accordance with this invention are those containing the above-listed surface-active dispersing agents and hydrocarbon solvent dispersing agents.

The amount of polychloro bicyclo[2.2.1]heptane in the composition with the inert material which facilitates the mechanical distribution of the toxicant will depend upon the type of inert material and the use to which it is to be put. The compositions will generally contain less than about 30% polychloro bicyclo[2.2.1]heptane. Agricultural dusts may contain 40–60% polychloro bicyclo[2.2.1]heptane as concentrates and will generally contain 10–30% polychloro bicyclo[2.2.1]heptane in the form as used. Household sprays will contain from 0.1 to 10% polychloro bicyclo[2.2.1]heptane, preferably about 2.5% in deodorized kerosene, but concentrates may contain 25–90% polychloro bicyclo[2.2.1]heptane. Agricultural sprays will, likewise, contain 0.1 to 10% of the polychloro bicyclo[2.2.1]heptane. Aqueous emulsions will contain sufficient surface-active dispersing agent to maintain an emulsion of the polychloro bicyclo[2.2.1]heptane during the spraying process. Concentrates from which emulsions are made may contain 25–90% polychloro bicyclo[2.2.1]heptane along with the surface-active dispersing agent.

For many purposes, it may be desirable to use the chlorinated cyclopentadiene-vinyl compound condensate in combination with other insecticidal toxicants. Many toxicants have a very high knockdown in relatively dilute solutions, but higher concentrations must be used in order to obtain the desired degree of kill. Due to the very high degree of killing power which the polychloro bicyclo[2.2.1]heptanes possess, these compounds may be added to such toxicants, thereby enabling the use of much more dilute solutions than would otherwise be possible. Toxicants with which these polychloro bicyclo[2.2.1]heptanes may be combined include such compounds as rotenone, pyrethrum, and organic thiocyanates such as alkyl thiocyanates, thiocyanoethers such as $\beta$ - butoxy - $\beta'$ - thiocyanoethyl ether, and terpene thiocyanoacylates such as isobornyl thiocyanoacetate, fenchyl thiocyanoacetate, isobornyl $\alpha$-thiocyanopropionate, etc.

The insecticidal compositions of this invention are useful in combatting flies, mosquitoes, roaches, moths, carpet bettles, bedbugs, boll weevils, boll worms, army worms, grasshoppers, and many other pests.

This application is a continuation-in-part of application Serial Number 775,153, filed September 19, 1947, now abandoned.

What I claim and desire to protect by Letters Patent is:

1. An insecticidal composition comprising a polychlorobicyclo[2.2.1]heptane containing 55–75% by weight of chemically combined chlorine and an insecticidal adjuvant as a carrier therefor, said polychlorobicyclo[2.2.1]heptane being the product obtained by chlorinating 2-methylbicyclo[2.2.1]-5-heptene dissolved in an inert solvent with chlorine gas in the presence of a free radical-forming chlorination catalyst at a temperature in the range of about 0–150° C.

2. The composition of claim 1 wherein the insecticidal adjuvant is a surface-active dispersing agent.

3. The composition of claim 1 wherein the insecticidal adjuvant is an aqueous emulsion with a surface-active dispersing agent.

4. The composition of claim 1 wherein the insecticidal adjuvant is clay.

5. The composition of claim 1 wherein the insecticidal adjuvant is a hydrocarbon solvent.

GEORGE ALLEN BUNTIN.

References Cited in the file of this patent

UNITED STATES PATENTS

| Number | Name | Date |
|---|---|---|
| 2,351,311 | Alder et al. | June 13, 1944 |
| 2,519,190 | Hyman | Aug. 15, 1950 |

OTHER REFERENCES

Frankforter et al.: Journal American Chemical Society, volume 28, pages 1461 to 1467 (1906).

Prill: Journal American Chemical Society, pages 62 to 63, January 1947.